United States Patent
Potter et al.

(10) Patent No.: US 7,335,999 B2
(45) Date of Patent: Feb. 26, 2008

(54) FLUID ACTUATED ROTATING DEVICE INCLUDING A LOW POWER GENERATOR

(75) Inventors: Calvin C. Potter, Mesa, AZ (US); David M. Eschborn, Gilbert, AZ (US)

(73) Assignee: Honeywell International, Inc., Morristown, NJ (US)

( * ) Notice: Subject to any disclaimer, the term of this patent is extended or adjusted under 35 U.S.C. 154(b) by 127 days.

(21) Appl. No.: 10/869,552

(22) Filed: Jun. 15, 2004

(65) Prior Publication Data
US 2005/0275224 A1 Dec. 15, 2005

(51) Int. Cl.
F03B 13/12 (2006.01)
F03B 13/00 (2006.01)
H02P 9/04 (2006.01)
(52) U.S. Cl. .......................................... 290/43; 290/54
(58) Field of Classification Search .................. 290/43, 290/54, 53, 1 R, 2 A
See application file for complete search history.

(56) References Cited

U.S. PATENT DOCUMENTS

| | | | |
|---|---|---|---|
| 4,208,592 A | 6/1980 | Leibow et al. | |
| 4,322,673 A | 3/1982 | Dukess | |
| 4,496,845 A * | 1/1985 | Ensign et al. | 290/43 |
| 4,511,806 A * | 4/1985 | May | 290/43 |
| 5,149,984 A * | 9/1992 | Schultz et al. | 290/54 |
| 5,184,458 A | 2/1993 | Lampe et al. | |
| 5,296,799 A | 3/1994 | Davis | |
| 5,384,489 A | 1/1995 | Bellac | |
| 5,394,848 A | 3/1995 | Tsutsumi et al. | |
| 5,460,239 A | 10/1995 | Jensen | |
| 5,489,765 A | 2/1996 | Fezza | |
| 6,051,892 A * | 4/2000 | Toal, Sr. | 290/43 |
| 6,107,692 A * | 8/2000 | Egri et al. | 290/43 |
| 6,294,842 B1 | 9/2001 | Skowronski | |
| 6,327,858 B1 | 12/2001 | Negre et al. | |
| 6,360,535 B1 | 3/2002 | Fisher | |
| 6,407,465 B1 | 6/2002 | Peltz et al. | |
| 6,927,501 B2 * | 8/2005 | Baarman et al. | 290/43 |
| 2001/0013702 A1 * | 8/2001 | Yanase et al. | 290/40 C |
| 2003/0093995 A1 * | 5/2003 | Tadayon et al. | 60/651 |
| 2003/0218338 A1 * | 11/2003 | O'Sullivan et al. | 290/43 |

* cited by examiner

*Primary Examiner*—Julio C. Gonzalez
(74) *Attorney, Agent, or Firm*—Ingrassia Fisher & Lorenz

(57) ABSTRACT

A fluid-powered actuator assembly is modified to include a low power generator. The low power generator rotates in response to a drive force received from the actuator assembly, and thus only generates electrical power when the actuator assembly is operating. The low power generator is used to supply electrical power to various sensors and circuits, which may be used to implement prognostic and health monitoring capabilities for the actuator assembly.

12 Claims, 2 Drawing Sheets

FLUID ACTUATED ROTATING DEVICE INCLUDING A LOW POWER GENERATOR

TECHNICAL FIELD

The present invention relates to fluid actuated devices and, more particularly, to fluid actuated rotating devices that are modified to include one or more low power generators.

BACKGROUND

Many aircraft include numerous fluid-powered devices that are configured to selectively rotate upon receipt of a pressurized fluid. For example, many aircraft are equipped with fluid-powered valve actuators, fluid-powered thrust reverser actuators, and air turbine starters, just to name a few. In most instances, these devices are disposed within systems that may only selectively supply fluid to the devices, to thereby cause the devices to rotate.

Although the exemplary devices mentioned above are safe, reliable, and generally robust, it is becoming increasingly desirable to generate and supply various potential fault and prognostic information about these and other types of devices. This type of information can be used to determine device lifetime by predicting potential faults and, in some instances, may be used to increase overall useful lifetime of a device. However, in many cases fluid-powered rotating devices, such as those mentioned above, may not include any electrical power connections. Thus, it may not be possible to add various electrical components, such as control solenoids or various sensors, or electrically powered interfaces or other circuitry, to the device that may be needed to supply fault and prognostic information.

To overcome the above-noted drawback associated with many fluid-powered devices, various systems could be modified to supply electrical power to the devices. Such a solution, however, could be costly, time-consuming, and weight prohibitive. Hence, there is a need for a system and method of supplying electrical power to fluid-powered rotating devices that do not presently include such capability. The present invention addresses at least this need.

BRIEF SUMMARY

The present invention provides a system and method for supplying electrical power to fluid-powered rotating devices that do not presently include such capability.

In one embodiment, and by way of example only, an actuation control system includes a control circuit, a fluid-flow control device, a fluid-powered actuator, and a generator. The control circuit is configured to supply one or more actuation command signals. The fluid-flow control device is adapted to couple to a pressurized fluid source, and is further coupled to receive the actuation command signals and is operable, in response thereto, to selectively supply a flow of the pressurized fluid. The fluid-powered actuator assembly is coupled to receive the flow of pressurized fluid from the fluid-flow control device and is configured, upon receipt thereof, to supply a drive force. The generator is coupled to receive the drive force from the actuator assembly and is configured, in response thereto, to generate a voltage.

In another exemplary embodiment, an actuator assembly includes a housing assembly, an actuator, a generator, and an open-loop controller. The housing assembly is adapted to selectively receive a flow of fluid from to a fluid power source. The actuator is rotationally mounted at least partially within the housing and is configured, upon selective receipt of the flow of fluid to the housing, to rotate and thereby supply a rotational drive force. The generator is coupled to receive the rotational drive force from the actuator and is configured, upon receipt thereof, to generate a voltage. The open-loop controller is coupled to receive the voltage generated by the generator and is configured, upon receipt thereof, to supply a regulated voltage.

Other independent features and advantages of the preferred actuators will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description. In this regard, while the following detailed description describes system that includes a fluid-powered actuator, it will be appreciated that the invention is not limited to a particular actuator or system that includes a particular actuator. Rather, the present invention may be used with any one of numerous types of fluid actuated rotating devices.

Figure 1:
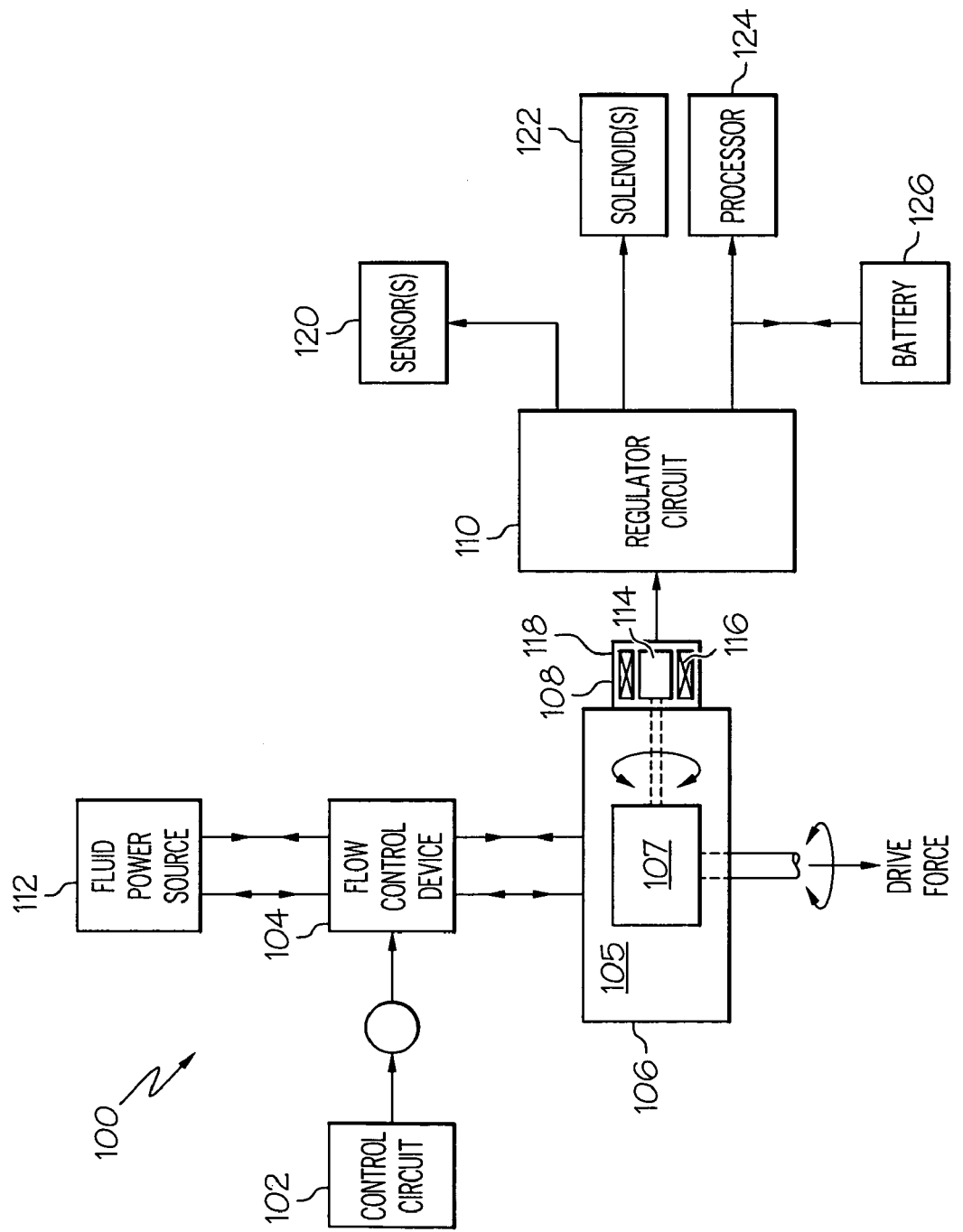
FIG. 1 is a functional block diagram of an exemplary fluid-powered actuation system modified to include an electrical generator according to an exemplary embodiment of the present invention.

Turning now to the description, and with reference first to FIG. 1, an exemplary fluid-powered actuation system 100 is shown. The system 100 includes an actuation control circuit 102, a flow control device 104, a fluid-powered actuator assembly 106, a generator 108, and a regulator circuit 110. The actuation control circuit 102 is configured to receive one or more input signals from one or more non-illustrated external systems and/or devices and, in response to these input signals, to supply actuation control signals. The external systems may vary depending on the particular type of fluid-powered actuator assembly 106 and the system in which the fluid-powered actuator assembly 106 is disposed. For example, if the fluid-powered actuator assembly 106 is installed in a thrust reverser actuation system, the external signal may be supplied, for example, from an engine controller, such as a FADEC (full authority digital engine controller).

No matter the particular system that supplies the input signals, the actuation control circuit 102 supplies appropriate actuation control signals to the flow control device 104. In response to the actuation control signals, the flow control device 104 selectively allows or prevents fluid flow from a fluid power source 112, which may be either a hydraulic or pneumatic power source, to the fluid-powered actuator assembly 106. It will be appreciated that the flow control device 104 may be any one of numerous types of devices capable of selectively controlling fluid flow. However, in the depicted embodiment, the flow control device 104 is an electrically operated valve. It will additionally be appreciated that when the flow control device 104 is implemented as a valve, the type of valve used may vary.

The fluid-powered actuator assembly 106, which may be any one of numerous types of fluid-powered actuators, includes an actuator housing 105 and an actuation device 107. When the actuation control circuit 102 supplies actuation commands that cause the flow control device 104 to allow fluid to flow from the fluid power source 112 to the actuator assembly 106, the actuator assembly 106, upon receipt of the fluid, rotates and generates a drive force. More specifically, fluid from the fluid power source 112 flows through the flow control device 104, and into and through the actuator housing 105 and actuation device 107. The actuation device 107, in response to the fluid flow there through, generates the drive force.

The drive force generated by the fluid-powered actuator assembly 106 is primarily used to drive one or more other devices. For example, in one embodiment the fluid-powered actuator assembly 106 is implemented as a valve actuator and is used to drive a valve to its open or closed position or to a position between the open and closed positions. In other embodiments, the fluid-powered actuator assembly 106 is implemented as a thrust reverser actuator that is used to drive one or more moveable components of a thrust reverser system. In still other embodiments, the fluid-powered actuator assembly 106 is implemented as an air turbine starter (ATS) that, upon receipt of pressurized fluid flow, supplies a drive force to a gas turbine engine to assist in starting the gas turbine engine. It will be appreciated that these actuator implementations are merely exemplary, and that the fluid-powered actuator assembly 106 could be implemented in any one of numerous other configurations and/or systems.

In addition to supplying a drive force to one or more other devices, the actuator assembly 106 also supplies a drive force to the generator 108. The generator 108, which is coupled to the actuator assembly 106, rotates in response to the supplied drive force. As the generator 108 rotates, it generates electrical power, which may then be supplied to one or more loads. It will be appreciated that the generator 108 may be implemented as any one or numerous types of generators now known, or developed in the future. In a preferred embodiment, as depicted in FIG. 1, the generator 108 is implemented as a permanent magnet (PM) generator.

As is generally known, a PM generator includes a permanent magnet rotor 114 and a stator 116. The rotor 114 is rotationally mounted within a housing 118 and is preferably implemented as a two-pole rotor, though it will be appreciated that it could be implemented as a four-pole, six-pole, or other multi-pole rotor. The generator housing 118 is preferably adapted to couple to the actuator assembly housing 105, either within or external to the actuator assembly housing 105. It will be appreciated, however, that it could also be disposed adjacent to the actuator assembly 106. In any case, the available installation space envelope may be limited. Hence, the number of rotor poles will depend, at least in part, on the available space envelope into which the generator 108 is being installed.

The stator 116 may also be implemented in one of numerous configurations. For example, the stator 116 may be implemented in a single-phase, a two-phase, or a three-phase configuration. The particular configuration may depend, for example, on the desired power output, power quality, weight, and, similar to the rotor 114, the available space envelope.

The generator 108, as was noted above, generates electrical power when it is rotated by actuator assembly 106. In the depicted embodiment, the generator 108 generates an AC voltage signal having a frequency that depends on the number of poles and the rotational speed of the rotor 114. This AC voltage is supplied to the regulator circuit 110, which functions to supply one or more regulated DC voltage signals. The number and magnitudes of the regulated DC voltage signals may vary, depending on the particular devices being powered. In a particular preferred embodiment the regulator circuit 110 supplies four regulated DC voltage signals. In the depicted embodiment, these DC voltage signals include a +28 VDC signal, a +5 VDC signal, a +15 VDC signal, and a −15 VDC signal.

The number and magnitude of the DC voltage signals supplied by the regulator circuit 110 may vary, depending on the particular type and number of circuits and components that the generator 108 is selectively powering. For example, and as shown in FIG. 1, the generator 108 may selectively supply power to one or more sensors 120, one or more control solenoids 122, one or more processors 124, and one or more batteries 126. In such an embodiment, the battery 126 is preferably used to power the processor 124 when the actuator assembly 106, and thus the generator 108, are not being rotated. Then, when the actuator assembly 106 and generator 108 are rotated, a portion of the electrical power generated by the generator 108 is used to re-charge the battery 126 and to power the processor 124, while the remaining portion is used to power the sensors 120 and the control solenoids 122.

Figure 2:
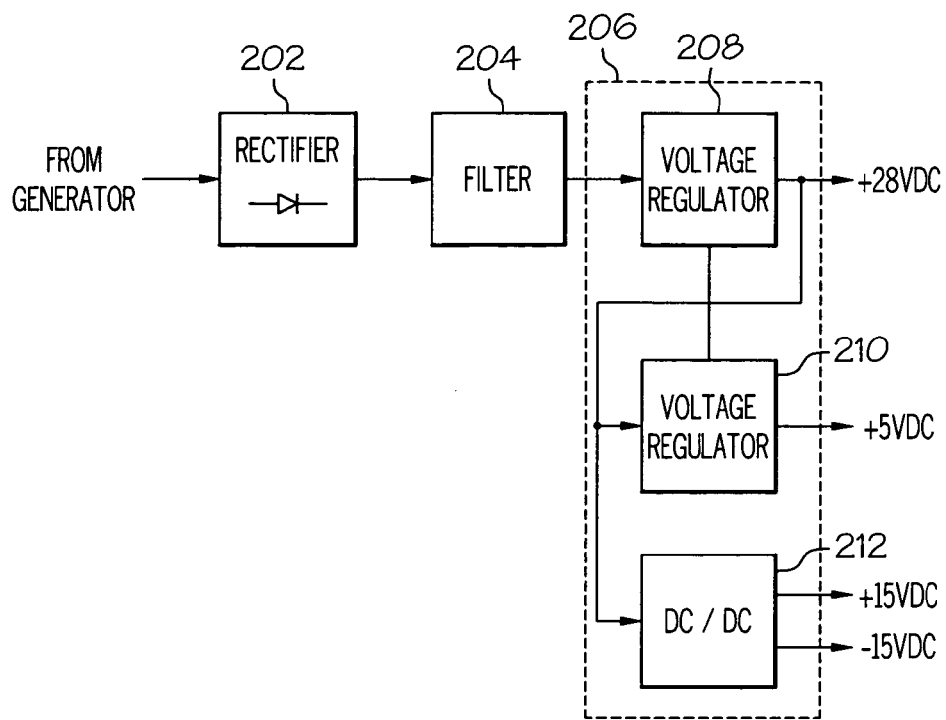
FIG. 2 is a functional schematic block diagram of an exemplary control circuit that may be used with the electrical generator of FIG. 1 to supply one or more regulated voltage signals.

No matter the particular number and magnitude of the voltage signals supplied by the regulator circuit 110, nor the particular type and number of loads electrically coupled thereto, it will be appreciated that, at least in the depicted embodiment, the regulator circuit 110 is implemented as an open-loop regulator. A description of a particular preferred embodiment of the regulator circuit 110 is shown in FIG. 2, and will now be described in more detail.

The regulator circuit 110 includes a rectifier circuit 202, a filter circuit 204, and a voltage regulator circuit 206. The rectifier circuit 202 receives the AC voltage signal supplied by the generator 108, and rectifies it to a DC signal. This rectified DC signal is then supplied to the filter circuit 204, which removes the high-frequency components from the rectified DC signal, thereby supplying a smoothed DC signal to the voltage regulator circuit 206. It will be appreciated that the rectifier circuit 202 may be implemented as any one of numerous rectifier circuit configurations, and that the filter circuit 204 may be implemented as any one of numerous low-pass filter circuit configurations.

The voltage regulator 206 receives the smoothed DC signal from the filter circuit 204 and supplies a plurality of regulated DC voltage signals, each at a substantially constant voltage magnitude. As noted above, in the depicted embodiment, these voltage magnitudes include first, second, third, and fourth voltage magnitudes of +28 V, +5 V, +15 V, and −15 V, respectively. The voltage regulator circuit 206 may be implemented in any one of numerous circuit configurations for supplying multiple regulated DC voltage signals at multiple DC voltage magnitudes. In the depicted embodiment, which is by no means limiting, the regulator circuit 206 is implemented as three voltage regulator circuits, a first regulator circuit 208, a second regulator circuit 210, and a DC/DC converter circuit 212.

The first regulator circuit 208 receives the smoothed DC signal from the filter circuit 204, and supplies the first regulated DC voltage signal (e.g., +28 VDC). The first regulated DC voltage signal is used to supply power to numerous and varied external components. For example, in the instance in which the first regulated DC voltage signal is a +28 VDC signal, the first regulated voltage signal may be supplied to the sensors 120 and/or the control solenoids 122. As will be described further below, this signal may also be supplied to one or more batteries to either re-charge, or maintain the charge on, the batteries 126.

In the depicted embodiment, the first regulated DC voltage signal is also supplied to the second voltage regulator circuit 210 and to the DC/DC converter circuit 212. The second voltage regulator circuit 210 functions similar to the first voltage regulator circuit 208, and supplies the second regulated DC voltage signal (e.g., +5 VDC). The DC/DC converter 212 converts the first regulated DC voltage signal to third and fourth substantially constant DC voltage signals (e.g., +15 VDC and −15 VDC, respectively). The second regulated voltage signal is preferably used to supply power to one or more non-illustrated digital circuits, if used, and the third regulated voltage signal is preferably used to supply power to one or more non-illustrated analog circuits, if used.

It will be appreciated that the configuration of the regulator circuit depicted in FIG. 2 and described herein is merely exemplary and that various other circuit configurations could be used to implement the regulator circuit 110. For example, any one or all of the first regulator circuit 208, the second regulator circuit 210, and the DC/DC converter 212 could all be directly coupled to the output of the rectifier circuit 202 or the filter circuit 204.

Figure 3:
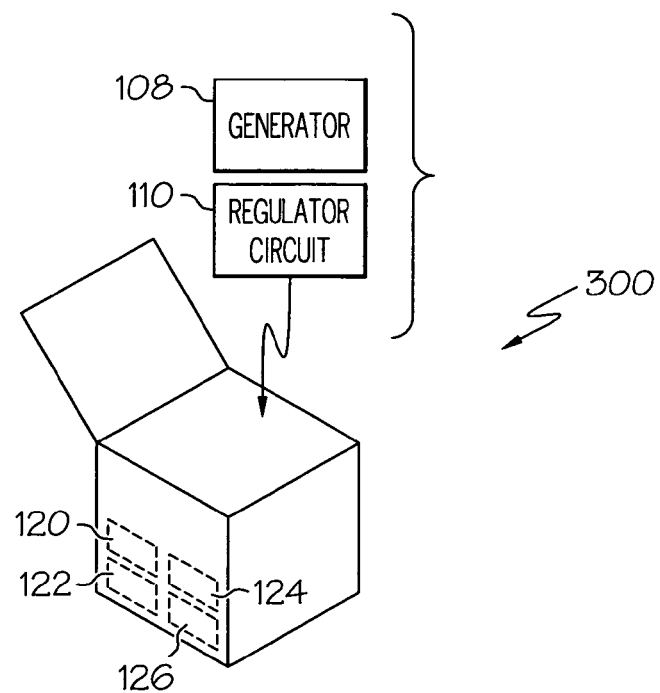
FIG. 3 is a simplified diagram of an exemplary kit according to an exemplary embodiment of the present invention that may be used to modify a fluid-powered actuator to include an electrical generator.

The generator 108, the regulator circuit 110, and one or more of the remaining external components, such as the sensors 120, the control solenoids 122, the processor 124, and the batteries 126, may be provided as individual components, or as part of a kit that may be used to modify the fluid-powered actuator assembly 106. An exemplary embodiment of such a kit 300 is shown in FIG. 3.

Having described the power generation system 100 in detail from a structural standpoint, a more detailed description of the system from a functional standpoint will now be provided. Before doing so, it is pointed out that the following description is based on the assumption that the fluid-powered actuator assembly 106 is a thrust reverser actuator installed in a non-illustrated thrust reverser system and coupled to a thrust reverser. However, as was previously stated numerous times, this is merely exemplary of any one of numerous embodiments.

Referring back to FIG. 1 once again, when it is desired to move the thrust reversers to a deployed position, the actuation control circuit 102 issues an appropriate command signal to the flow control device 104. In response, the flow control device 104 opens, allowing fluid to flow from the fluid power source 112 to, and through, the fluid-powered actuator assembly 106 in a first direction. Upon receipt of the fluid flow, the actuation device 107 rotates and supplies a drive force to the thrust reverser, causing it to move to the deployed position.

While the actuation device 107 is supplying the drive force to the thrust reverser, it is also supplying a drive force to the generator 108, causing the generator to generate electrical power. The electrical power generated by the generator 108 is supplied to the sensors 120, the processor 124, and the batteries 126. The sensors 120 thus become operable, and sense one or more physical parameters associated with the actuator assembly 106 and supply sensor signals representative thereof to the processor 124. The processor 124 in turn processes the sensor signals and supply one or more signals to, for example, an external system for additional processing.

When the thrust reverser reaches the fully deployed position, the actuation control circuit 102 issues an appropriate command signal, and the flow control device 104 closes. Thus, fluid flow to the fluid-powered actuator 106 ceases, and the actuation device 107 ceases its rotation. As a result, the generator 108 also stops rotating and generating electrical power. With no power being supplied from the generator 108, the sensors 120 no longer operate, and the processor 124 is powered from the batteries 126.

Thereafter, when it is desired to return the thrust reversers to the stowed position, the actuation control circuit 102 issues an appropriate command signal to the flow control device 104. In response, the flow control device 104 opens, allowing fluid to flow from the fluid power source 112 to, and through, the fluid-powered actuator assembly 106 in a second direction that is opposite the first direction. As before, upon receipt of the fluid flow, the actuation device 107 rotates and supplies a drive force to the thrust reverser. However, in this case the actuation device 107 rotates in a direction that causes it to move to the thrust reverser to the stowed position. While the actuation device 107 is moving the thrust reverser to the stowed position, the generator 108 will rotated and generate electrical power.

The system described herein allows presently existing, and presently installed fluid-powered actuator assemblies to be readily modified to generate and supply electrical power. The generated electrical power may then be used to power various sensors, control solenoids, processors, and/or batteries. Such devices may be used, for example, to provide prognostic and health monitoring capabilities to the fluid-powered actuators.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. An actuation control system, comprising:
    an actuation control circuit configured to supply one or more actuation control signals;
    a flow control device adapted to couple to a fluid power source, the flow control device further coupled to receive the actuation control signals and operable, in response thereto, to selectively supply a flow of fluid from the fluid power source;
    a fluid-powered actuator assembly coupled to receive the flow of fluid from the flow control device and configured, upon receipt thereof, to supply a drive force;
    a driven component coupled to receive at least a first portion of the drive force from the actuator assembly and configured, in response thereto, to move; and
    a generator coupled to receive at least a second portion the drive force from the actuator assembly and configured, in response thereto, to generate a voltage, wherein the second portion of the drive force is not supplied via the driven component.

2. The system of claim 1, further comprising:
a regulator circuit coupled to receive the voltage generated by the generator and operable, upon receipt thereof, to supply one or more regulated voltage signals.

3. The system of claim 2, wherein the regulator circuit is an open-loop regulator circuit.

4. The system of claim 3, wherein the open-loop regulator circuit comprises:
a rectifier circuit coupled to receive the voltage generated by the generator and configured, upon receipt thereof, to supply a rectified DC voltage signal;
a filter circuit coupled to receive the rectified DC voltage signal and configured, upon receive thereof, to supply a smoothed DC voltage signal having high frequency AC signal components removed therefrom; and
one or more voltage regulator circuits coupled to receive the smoothed DC voltage signal and configured, upon receipt thereof, to supply one or more regulated DC voltage signals.

5. The system of claim 1, wherein the generator comprises:
a permanent magnet rotor; and
a stator.

6. The system of claim 1, further comprising:
one or more sensors coupled to receive the generated voltage from the generator, the sensors further coupled to the actuator and configured, upon receipt of the generated voltage, to sense one or more parameters associated with the actuator and supply a sensor signal representative thereof.

7. The system of claim 1, further comprising:
one or more batteries operable to supply a DC voltage, the batteries further coupled to receive at least a portion of the voltage generated by the generator; and
one or more processors coupled to the receive the DC voltage supplied from the batteries and the generated voltage from the generator, whereby the processors are powered by the batteries when the generator is not generating the voltage, and at least partially by the generator when the generator is generating the voltage.

8. The system of claim 1, wherein the fluid-powered actuator assembly comprises a fluid-powered turbine.

9. The system of claim 8, wherein the fluid-powered actuator assembly comprises a valve actuator.

10. The system of claim 8, wherein the fluid-powered actuator assembly comprises a thrust reverser actuator.

11. A method of supplying electrical power from a fluid-powered actuator assembly configured to generate a drive force upon receipt of a flow of fluid, the method comprising the steps of:
selectively supplying the flow of fluid to the fluid-powered actuator assembly, whereby the assembly generates the drive force;
supplying a first portion of the generated drive force to a driven component, whereby the driven component moves in response thereto; and
supplying a second portion of the generated drive force to a generator, whereby the generator supplies the electrical power,
wherein the second portion of the generated drive force is not supplied via the driven component.

12. The method of claim 11, further comprising:
regulating the electrical power supplied by the generator.

* * * * *

UNITED STATES PATENT AND TRADEMARK OFFICE
CERTIFICATE OF CORRECTION

| | | |
|---|---|---|
| PATENT NO. | : 7,335,999 B2 | Page 1 of 1 |
| APPLICATION NO. | : 10/869552 | |
| DATED | : February 26, 2008 | |
| INVENTOR(S) | : Calvin C. Potter et al. | |

It is certified that error appears in the above-identified patent and that said Letters Patent is hereby corrected as shown below:

Column 6, line 65, remove the text beginning with "second portion the" and insert --second portion of the--;
Column 7, line 17, "receive" should be changed to --receipt--;
Column 8, line 5, remove the text beginning with "coupled to the receive" and insert --coupled to receive--.

Signed and Sealed this

Seventh Day of October, 2008

JON W. DUDAS
*Director of the United States Patent and Trademark Office*